INVENTOR.
FREDERICK W. STEFFGEN
BY
ATTORNEY.

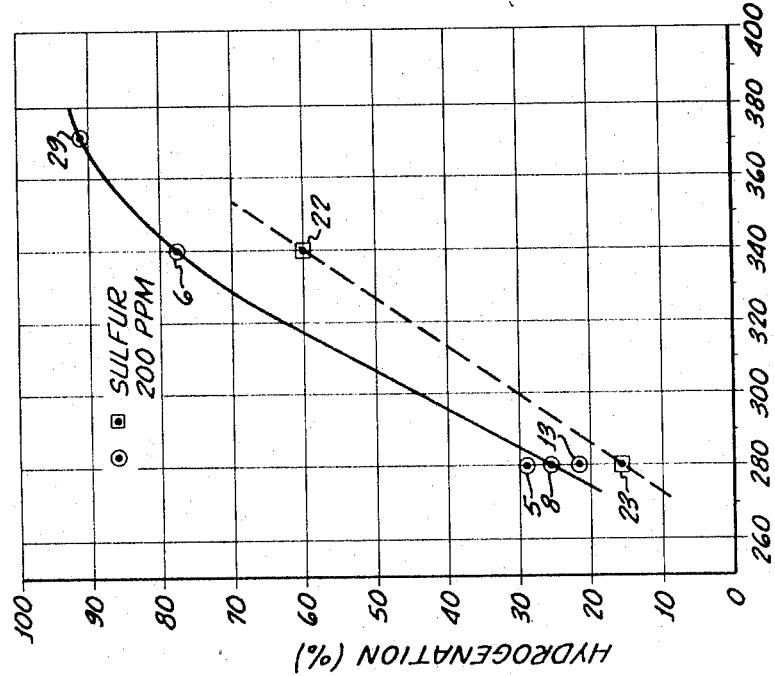
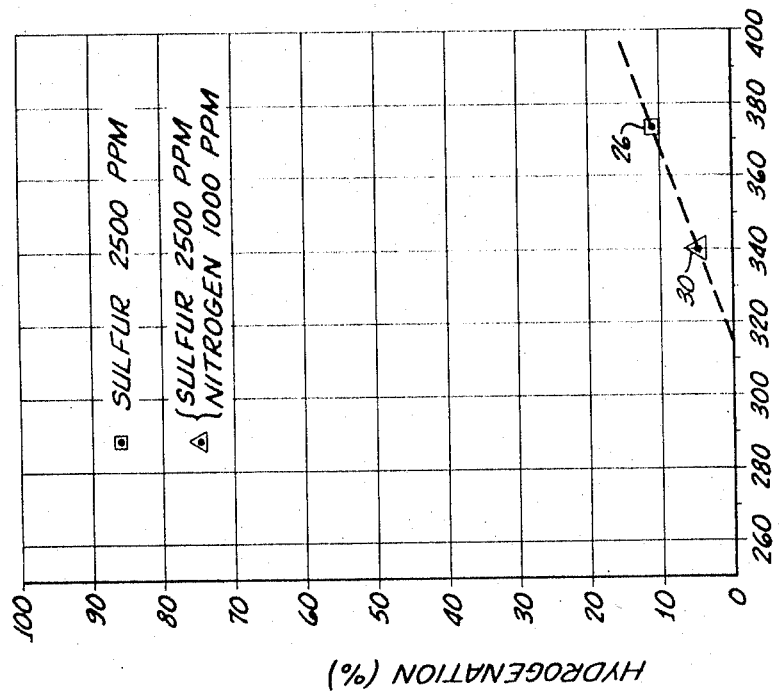

INVENTOR.
FRED W. STEFFGEN
BY
Grant L Hubbard
ATTORNEY.

United States Patent Office 3,463,829
Patented Aug. 26, 1969

3,463,829
NONDESTRUCTIVE CATALYTIC HYDROGENATION OF AROMATICS
Frederick W. Steffgen, Laguna Beach, Calif., assignor to Atlantic Richfield Company, Philadelphia, Pa., a corporation of Pennsylvania
Continuation-in-part of application Ser. No. 534,092, Mar. 14, 1966. This application June 4, 1968, Ser. No. 734,299
Int. Cl. C07c 5/10
U.S. Cl. 260—667
5 Claims

ABSTRACT OF THE DISCLOSURE

A process for the nondestructive hydrogenation of aromatic compounds which contain sulfur and/or nitrogen contaminants in the range of several hundred parts per million comprising reacting the contaminated aromatic compound with hydrogen in a molar ratio of above 5 moles of hydrogen per mole of aromatic in the presence of a platinum metal catalyst supported on substantially silica-free alumina in the temperature range of between about 320° C. and about 425° C. at a pressure of between 500 and 1500 p.s.i.g. and a liquid hourly space velocity of between about 0.25 and 15 is disclosed.

CROSS REFERENCE TO RELATED APPLICATION

Figure 1:
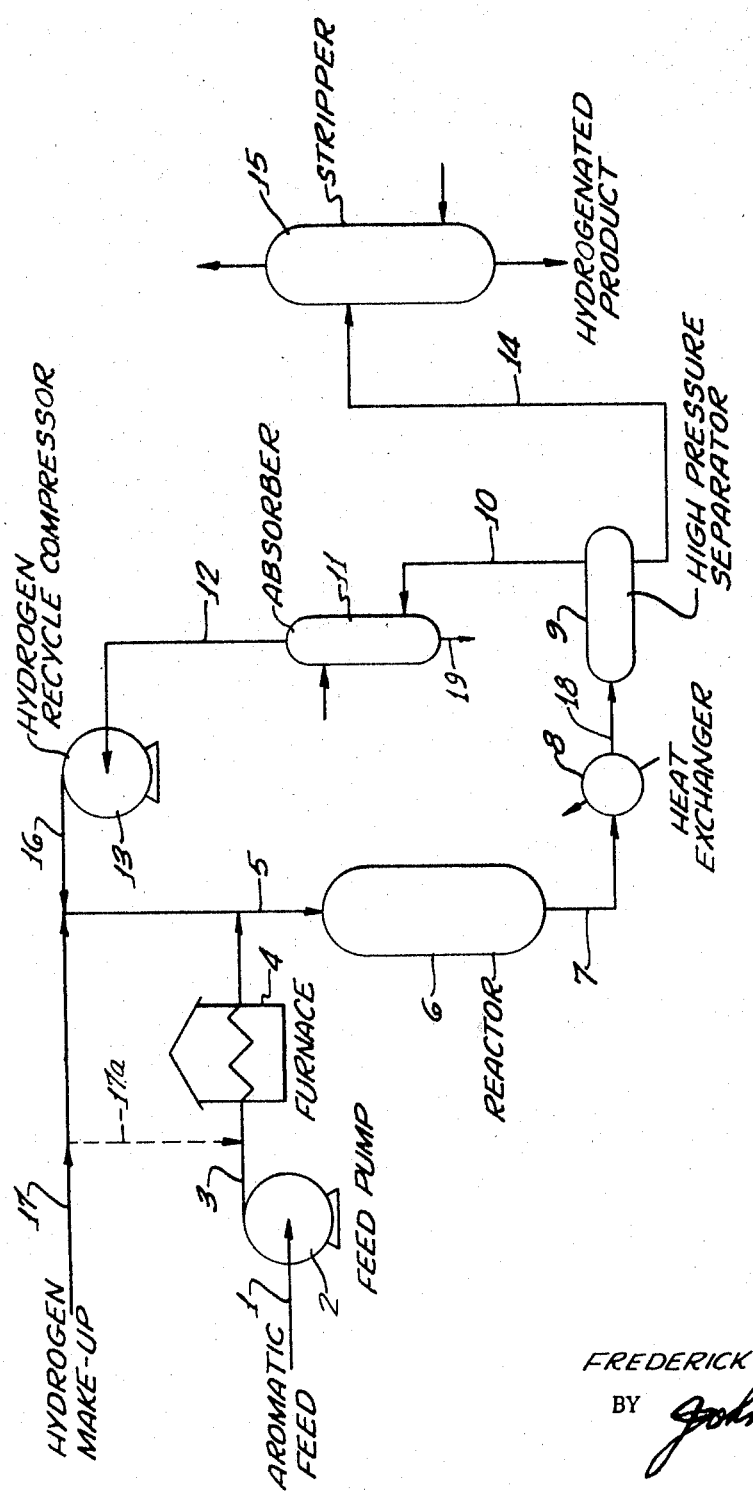

This is a continuation-in-part of my copending application Ser. No. 534,092, filed Mar. 14, 1966, entitled Process for Catalytically Hydrogenating Aromatics, now abandoned.

BACKGROUND OF THE INVENTION

Field of the invention

This invention relates to a process for hydrogenating aromatic compounds and more particularly to a method for hydrogenating aromatic hydrocarbons containing sulfur contaminants, to produce saturated hydrocarbons. More specifically, this invention is concerned with the hydrogenation of sulfur and nitrogen containing aromatic hydrocarbons in the presence of a sulfur-nitrogen sensitive platinum catalyst under conditions which enable the catalyst to remain active in the presence of combined sulfur and nitrogen contaminants. This invention is applicable to aromatic hydrocarbon containing feedstocks having both sulfur and nitrogen contaminants in amounts up to 2500 p.p.m. sulfur and 500 p.p.m. nitrogen or a sulfur content up to 5000 p.p.m. Nitrogen in almost any amount can be tolerated if it is present in a sulfur-free system. The sulfur contamination may occur in the form of mercaptans, thiophenes, dissolved hydrogen sulfide, sulfones and thioethers among other sulfur containing organic compounds. The nitrogen contamination may occur, among other ways, in the form of dissolved ammonia, pyridines, indoles, carbazoles, quinolines or amines.

Description of the prior art

In the past it has been necessary, whenever the aromatic feedstocks contained very small or trace amounts of sulfur, i.e., more than about 20 p.p.m., to first remove the sulfur before a platinum metal catalyst could be used. The removal of the sulfur has been necessary because the sulfur, if left in the feedstock, rapidly deactivated the platinum metal catalyst. As a result, the hydrogenation of sulfur and nitrogen containing feedstocks in the past has generally required a two-step process in which desulfurization and denitrogenation or hydrodesulfurization and hydrodenitrogenation to levels below .001% sulfur and .001% nitrogen are effected using a hydrotreating catalyst such as cobalt molybdate, which is relatively insensitive to sulfur and other contaminants, prior to the hydrogenation step.

Marechal et al., Patent No. 3,269,939 has described a method for hydrogenating aromatics in the presence of a platinum catalyst. Apparently because of the operating conditions actually tested, it was found that the only catalysts effective for the process described by Marechal et al. was a platinum metal supported on a high silica-alumina catalyst and, preferably, a silica-alumina catalyst having between 75 and 90 percent by weight of silica. Marechal et al. teach that at an operating temperature of 300° C., a space velocity of 6 v./v./hr. and at a pressure of approximately 500 p.s.i. a platinum catalyst supported on alumina or on a low silica alumina-silica support material is not effective to produce hydrogenation of aromatics when the sulfur content was as high as 300 parts per million. The hydrogenation yields were very much reduced when the sulfur content was as high as 100 parts per million. In this operating range, these results are supported by data obtained during the development of the present invention. The skilled chemist would conclude, on the basis of the teachings of Marechal et al., that sulfur in appreciable levels effectively presents hydrogenation of aromatics in the presence of platinum-low silica-alumina. Marechal et al., however, did point out that, quite surprisingly, when a high silica catalyst was used somewhat diminished but nevertheless effective hydrogenation could be obtained at temperatures in the range of 300° C. This result is contrary to previous experience and the teachings of the prior art. See, e.g., Sachanen, "Conversion of Petroleum," 2nd ed., Reinhold, 1948, p. 100; Gruse and Stevens, "Chemical Technology of Petroleum," McGraw-Hill, New York, 1960, p. 113 and such standard treatises as Emmett (Ed.) "Catalysis," Reinhold, New York, 1954. It is, of course, well known that certain metal catalysts, platinum and palladium in particular, are easily poisoned by sulfur compounds insofar as their hydrogenation catalytic activity is concerned; however, the hydrodesulfurization reaction of such catalysts at higher temperatures, usually hydrocracking conditions, is not so seriously adversely affected, Hettinger et al., Ind. Eng. Chem., vol. 47, p. 719 (1955).

Fortman, Patent No. 3,317,419, whose work was done contemporaneously with or subsequent to the present research, describes a multiple step desulfurization process using metallic components in the form of oxides and sulfides, such as the oxides and sulfides of molybdenum, nickel, and cobalt supported on a high silica containing catalyst support material. The process described by Fortman is not related directly to catalysts, per se, but rather to a particular method of handling contaminated streams. Fortman states that catalysts from Groups VI-B and VIII of the Periodic Table, as oxides and sulfides, are effective catalysts for this process but no data is given to support this broad range of catalysts. As previously pointed out, the sulfides and oxides of this class of metals may be comparatively effective as hydrodesulfurization and hydrodenitrogenation catalysts, although only trace amounts of aromatic hydrogenation will occur. If the conditions are adjusted to accomplish substantial aromatic hydrogenation, destructive reactions such as ring fission and the splitting off of alkyl groups usually occurs. Unlike Marechal et al., supra, however, Fortman did not conduct any experiments relating to the use of platinum metal catalysts.

A palladium catalyst supported on a unique high-silica molecular sieve base prepared by impregnation with a sulfide hydrosol is reported by Young, Patent No. 3,197,-398. Young suggests the use of metal selected from Groups VI-B, VII-B and VIII; however, the only data presented related to palladium compounds prepared in the unique manner described in said patent. It is there further suggested that the feed stocks may include relatively high amounts of sulfur and nitrogen but there is no experimental support for this statement and my experiments have shown that catalysts of this type are largely inactivated by sulfur. For example, in the hydrogenation of toluene, at 280° C., 800 p.s.i.g., hydrogen to toluene ratio of 5.0 and LHSV of 20, a catalyst of the type described by Young having 0.5% Pd yielded 35 percent naphthenes in the absence of sulfur.

Under the same operating conditions, but in the presence of 200 p.p.m. sulfur, the hydrogenation yield was only 3 percent. Even at higher temperatures, 370° C., only 10 percent of the toluene was hydrogenated. Following this, the same catalyst was maintained at 370° C. for one hour using a sulfur-free toluene stock. After one hour, only 14 percent of the toluene was hydrogenated. Four percent disproportionation of toluene occurred. While Young mentions platinum as being among those catalysts which may be prepared according to his method, no data are presented to indicate the operability of such catalysts in the presence of sulfur and nitrogen containing stocks. In view of the teachings of Marechal et al., however, it may be possible to guess that a platinum metal catalyst prepared according to the method of Young, on a high silica support, may possibly be effective in the presence of sulfur at levels up to 300 p.p.m. This is, however, only speculation since, as pointed out by Sachenen, supra, p. 376, "The development of hydrogenation catalysts is rather a matter of guess and gambling as in other fields of catalytic processes." In any event, the teachings of the prior art generally, and the teachings of Marechal et al. in particular, strongly suggest that it would be futile to attempt to perform aromatic hydrogenation in the presence of high sulfur and/or nitrogen contaminants on a low silica or pure alumina supported platinum metal catalyst.

It has now been discovered that, under certain operating conditions, hydrogenation of aromatics can be carried out with relatively high efficiency even in the presence of high levels of sulfur and/or nitrogen contamination on platinum metal catalysts supported by silica-free alumina. Since aromatics are more readily adsorbed on alumina than upon silica or high silica containing supports, a greater proportion of the feed is present at the point of catalytic action. Therefore, there is an advantage in using a pure alumina, or at least a low silica containing alumina, support for metallic platinum aromatic hydrogenation catalysts. There is a somewhat greater tendency to cracking using a high silica catalyst with the consequent disadvantage of coking. This disadvantage is obviated or drastically reduced by using a pure alumina or low silica alumina catalyst. Accordingly, it is an object of this invention to provide an improved process for hydrogenating aromatics in the presence of a silica-free or low-silica alumina supported platinum metal catalyst.

SUMMARY OF THE INVENTION

The present invention provides a method whereby one-stage hydrogenation can be effected using an alumina supported platinum metal catalyst heretofore regarded as too susceptible to deactivation in the presence of both sulfur and nitrogen to be used in the hydrogenation of aromatic hydrocarbons which were not substantially free of both nitrogen and sulfur contaminants, particularly sulfur. The present process also provides a means by which much higher liquid hourly space velocities can be maintained during the hydrogenation of aromatic containing combined nitrogen and sulfur contaminants than has heretofore been realized using conventional sulfur resisting catalysts. Although a silica-free alumina supported platinum metal catalyst is not as effective in the hydrogenation of sulfur and nitrogen containing aromatic hydrocarbons as it is when the feed is free of these materials, it is far more effective than the commonly used sulfur resistant catalysts. Following the present process, alumina supported platinum metal catalysts have been used for extensive periods of time in hydrogenating sulfur and nitrogen containing feeds without showing any significant deactivation.

Accordingly, it is an object of the present invention to provide a method for catalytically hydrogenating aromatic hydrocarbons containing both sulfur and nitrogen contaminants in the presence of a platinum catalyst supported on alumina.

Another object of the present invention is to provide a method for hydrogenating aromatic hydrocarbons containing both sulfur and nitrogen in a one-stage hydrogenation process which alleviates the need for an initial desulfurization step when the sulfur content is not above 2500 p.p.m.

Another object of the present invention is to provide a method for hydrogenating aromatic hydrocarbons containing between 20 and 2500 p.p.m. sulfur and between 10 and 500 p.p.m. nitrogen in the presence of a platinum catalyst supported on effectively silica-free alumina.

Another object of the present invention is to provide a method for hydrogenating aromatic hydrocarbons containing sulfur and nitrogen contaminants in the presence of a platinum catalyst by hydrogenating said aromatic hydrocarbons under conditions which create a dynamic equilibrium between the adsorption and desorption of sulfur and nitrogen compounds on the alumina supported platinum catalyst.

Another object of the present invention is to provide a method for hydrogenating aromatic hydrocarbons containing sulfur poisons in amounts up to 5000 p.p.m. using a platinum catalyst on an essentially silica-free support.

Various other objects and advantages will appear from the following description of the embodiments of the invention, and novel features will be particularly pointed out hereinafter in connection with the appended claims.

Briefly described, this invention is concerned with the hydrogenation of sulfur and nitrogen contaminated aromatic hydrocarbon containing feedstocks over a platinum catalyst on a low silica or silica-free alumina support under selected conditions of pressure, temperature, hydrogen to aromatic ratio, and liquid hourly space velocity which conditions enable the establishment of a reaction status of dynamic equilibrium wherein the rate of adsorption of the fouling materials is equal to the rate of desorption of the fouling materials.

In one preferred embodiment of the present invention wherein both sulfur and nitrogen are contained in the feedstock in relatively high amounts, i.e., about 2000 p.p.m. sulfur and about 200 p.p.m. nitrogen, an aromatic hydrocarbon containing feedstock is admixed with hydrogen in a molar ratio of above about 5:1 molar ratio of hydrogen to aromatic hydrocarbon and then passed into a reaction zone over a platinum catalyst. The temperature during hydrogenation is controlled at about 320° to about 425° C., the pressure is maintained at between 500 and 1500 p.s.i.g., and a liquid hourly space velocity of between 0.25 and 15 is maintained.

The conditions such as temperature, pressure, and liquid hourly space velocity used in the present invention may vary considerably depending upon the character of the feedstock. A feedstock containing both high sulfur and high nitrogen contamination, i.e., 2500 p.p.m. sulfur and 500 p.p.m. nitrogen, requires more severe hydrogenation conditions such as higher temperature, higher pressure, and a higher hydrogen to aromatic hydrocarbon ratio than is required when the aromatic hydrocarbon containing feed has a lower combined sulfur and nitrogen content.

When the feedstock contains an appreciable amount of both sulfur and nitrogen, a temperature range of 320° to 425° C. and a pressure of at least 500 p.s.i.g. is required. The temperature and other variables must be so controlled that a condition of substantial dynamic equilibrium is established, that is, the rate of adsorption and desorption of temporary catalyst poisons such as hydrogen sulfide and ammonia or other sulfur and nitrogen containing compounds on the platinum catalyst must be substantially equal and the fraction of unoccupied catalyst sites must remain sufficient to be effective.

It is believed that when conditions of dynamic equilibium have been established, platinum sulfide is formed and decomposed at an equal rate, or that hydrogen sulfide and ammonia are adsorbed on the platinum catalyst and desorbed from the platinum catalyst at an equal rate. Thus, when the proper conditions are met, the catalyst undergoes a "self cleaning" process which enables it to retain its activity in the presence of poisonous material such as sulfur and sulfur with nitrogen.

The mechanism by which the dynamic equilibrium is established is not fully known. When conditions of dynamic equilibrium have been established, the reactor system at a given set of conditions shows a steady state of catalytic activity. By changing any of the conditions such as temperature, sulfur content, nitrogen content, pressure, or hydrogen-to-feed ratio, the activity of the catalyst is altered. The catalyst rapidly achieves an activity commensurate with the steady state of adsorbed fouling. This steady state of adsorbed fouling in turn provides a catalyst having a constant activity.

Any change in the temperature, pressure, hydrogen-to-feed ratio, feed sulfur content, or feed nitrogen content, will rapidly shift the degree of fouling to a new level and at the same time change the catalyst activity to a new level and establish new steady state conditions for the achievement of dynamic equilibrium.

Temperature control plays a large part in the establishment of dynamic equilibrium. The temperature can vary from 320° C. to 450° C. depending primarily upon the sulfur or sulfur and nitrogen content. If the nitrogen content is low, i.e., about 30 p.p.m. or less, however, temperatures as low as 150° C. can be used in the presence of lesser amounts of sulfur. Similarly, when the sulfur content is very low and the nitrogen content is high, low temperatures may also be used to hydrogenate aromatic hydrocarbons continuously over the alumina supported platinum catalyst without causing deactivation of the catalyst. If the sulfur content is low enough, for example below 10 p.p.m., almost any level of nitrogen can be tolerated with only a small loss in activity of the platinum catalyst during hydrogenation. When both the sulfur and nitrogen content are high, i.e., a sulfur content up to 2500 p.p.m. and a nitrogen content up to 500 p.p.m., higher temperatures in the range of 320° C. to 450° C. are required.

The pressure used in hydrogenating aromatics in accordance with the process of the present invention may vary from 100 to 1500 p.s.i.g. or higher but preferably should be within a range of 250 to 1000 p.s.i.g. Relatively higher pressures (500 p.s.i.g. to 1500 p.s.i.g.) are desirable when both the sulfur and nitrogen content are high. Higher pressures can be used but are not practical.

The amount of hydrogen used is dependent upon the degree of unsaturation of the feed, the amount of sulfur or sulfur and nitrogen poison contained therein, and upon the degree to which aromatic reduction is desired. The hydrogen-to-feed molar ratio may be as high as 50:1, or even 200:1, moles of hydrogen per mole of aromatic hydrocarbon, although a molar ratio of 25:1 is a more practical upper limit. For most purposes, a hydrogen-to-feed molar ratio of between 5:1 and 25:1 is preferred.

The liquid hourly space velocity may vary from 0.25 to 40 depending upon the amount and nature of aromatics in the feed, the extent of nitrogen and sulfur contamination, and the degree of hydrogenation desired. Generally and preferably, a liquid hourly space velocity of 0.5 to 20 is used to achieve the desired conversion level.

The process of the present invention can be used in the hydrogenation of almost any aromatic hydrocarbon containing up to 2500 p.p.m. sulfur and 500 p.p.m. nitrogen in the feed, particularly if the hydrogenation is effected in the vapor phase. The feed may contain substantially all aromatic hydrocarbons or be composed only in part of aromatic hydrocarbons, such as would be the case with feedstocks which are converted into jet fuels. In the latter instance, not only the aromatic hydrocarbons would be hydrogenated, but essentially all olefinic materials would be hydrogenated to saturation using the present process.

It should be understood that when reference is made to the sulfur and nitrogen contents above, this content is based upon the percentage of sulfur and nitrogen in the liquid feed and not upon the amount of aromatic hydrocarbons contained within the feed since the aromatic portion may, in some instances, be a small percentage of the total feed. The sulfur and nitrogen compounds appear mainly in the combined form as hetero atoms in organic compounds.

The present process is not restricted to vapor phase reactions; however, greater efficiency is achieved under vapor phase conditions.

Aromatic hydrocarbons such as benzene, alkylbenzenes, naphthalene, and alkylnaphthalene, are readily hydrogenated using the present process.

The conditions which are used in conducting the hydrogenation often must be varied to meet the optimum hydrogenation conditions for the particular aromatic hydrocarbons being hydrogenated. For example, because of thermodynamic equilibrium considerations, aromatic hydrocarbons having a plurality of alkyl groups generally should be hydrogenated at temperatures lower than when aromatic hydrocarbons free of or having a small degree of alkyl branching are hydrogenated.

The platinum catalysts of the present invention are the type commonly used in the hydrogenation of unsaturated hydrocarbons which have had substantially all of the sulfur and nitrogen removed before hydrogenation. The catalytically active platinum metal is supported on alumina which is free of silica or contains chemically ineffective amounts of silica, e.g., below 25% and preferably below 8%, by weight, and should comprise from 0.1% to 10% by weight of the catalyst material, preferably 0.3% to 2%. Higher percentages of platinum can be used; however, they are not practical except possibly for liquid phase hydrogenations.

The process of the present invention is best performed as a continuous process in which hydrogen and a vaporized feed containing aromatic hydrocarbons are admixed and then passed through a reactor zone containing the platinum catalyst. When a continuous process is employed, a continuous flow of fresh hydrogen, or at least hydrogen having a low sulfur content (equivalent to less than 2000 p.p.m. sulfur based on the hydrocarbon feed) is introduced into the reactor. In batch processes, excessive amounts of hydrogen sulfide tend to be formed unless a very low sulfur content feed is being hydrogenated.

Platinum of the present invention apparently possesses unique properties among the normally sulfur sensitive noble metal hydrogenation catalysts since it functions effectively in the presence of sulfur. Other noble metal catalysts such as palladium and rhodium, which in the absence of sulfur poisons are effective and widely used hydrogenation catalysts, do not perform effectively in the presence of sulfur and nitrogen, as previously pointed out in the case of palladium, and further illustrated hereinafter for palladium and rhodium.

The present invention may be better understood by a reference to the drawing wherein FIGURE 1 is a flowsheet of a preferred embodiment of the present invention.

FIGURES 2–5 graphically illustrate data which will be discussed hereinafter.

Referring to FIGURE 1, aromatic feed is passed by means of line 1 into feed pump 2 where it is forced through line 3 into furnace 4 where it is heated to reaction temperature. Fresh hydrogen from line 17 and recycle hydrogen from line 16 is passed into contact with the aromatic feed either just prior to the entrance of the feed into the furnace or just after its exit from the furnace.

Usually if the aromatic feed is to be vaporized, the hydrogen will also be heated and may be admixed with the aromatic feed prior to entrance into the furnace via line 17a; whereas when the feed will remain at least in part in the liquid phase, the hydrogen is usually introduced to the aromatic feed via line 5 after the exit of the heated aromatic feed from the furnace.

The mixture of hydrogen and heated aromatic feed flows by means of line 5 into reactor 6 containing a platinum catalyst supported on a high surface area refractory support such as alumina. After the reaction has taken place, the effluent stream is passed through line 7 into heat exchanger 8 where it is cooled and then passed through line 18 into high pressure separator 9.

In separator 9, the liquified product and gas phase are separated. The gas phase, containing hydrogen, hydrogen sulfide, and ammonia is passed by means of line 10 into absorber 11 where the hydrogen sulfide and ammonia which form ammonium sulfide are removed through drain 19. The surplus hydrogen is removed from absorber 11 by means of line 12 and recycled by recycle compressor 13 for re-use via line 16.

The liquid product obtained in separator 9 is withdrawn by means of line 14 and passed into stripper 15 where dissolved hydrogen sulfide and other unwanted materials are removed from the liquid. The hydrogen sulfide may be removed by passing steam or other gas through the liquid in stripper 15. The stripping gas removes the hydrogen sulfide and the final hydrogenated product can then be removed.

The following examples are provided to further illustrate the present invention; however, they should not be construed as being limitative of the scope of the invention.

EXAMPLES 1-21

A number of test feeds comprising toluene and varying amounts of sulfur and nitrogen compounds as contaminants were made up. Each of these toluene feeds was passed into a steel reactor tube, a one inch heavy duty stainless steel pipe which contained 5 milliliters of 0.6 wt. percent platinum on silica-free alumina catalyst which was diluted with 95 milliliters of mullite, an inert material in this reaction. As the aromatic hydrocarbon feed was pumped into the inlet tubing, it mixed with hydrogen and was then blown into a preheater section of a reactor where the liquid was vaporized. The hydrogen and feedstock vapors then were passed concurrently over the granular platinum catalyst in a fixed bed. The vapors passed upward through the reactor to an outlet tube in which the effluent was cooled to approximately room temperature by convection air currents. From there, the resulting product passed into a high pressure separator where the liquid phase was separated from the gas phase. The gas was circulated through a condenser to remove any trace of liquifiable materials and then passed through a back pressure regulator where the pressure of the gases was reduced from the reactor pressure of 800 p.s.i.g. to atmospheric pressure. The liquid product was drained from a high pressure separator at intervals of approximately one hour. The amount of feedstock passed into the reactor was measured hourly with a feed burette in order that the liquid hourly space velocity could be calculated. The inlet hydrogen flow was also metered by means of a rotometer and the effluent gas was measured by a wet test meter in order that the hydrogen consumption could be observed. The liquid hourly space velocity was maintained at about 20 and a 5:1 molar hydrogen-to-aromatic ratio was maintained. The platinum catalyst was hydrogen sulfide pretreated to ensure a maximum platinum sulfide content at the start of the run. The results obtained using various amounts of sulfur and nitrogen compounds as contaminants in the toluene feed are shown in Table I.

TABLE I.—HYDROGENATION OF TOLUENE OVER 0.6 WT. PERCENT PLATINUM CATALYST

| Example: | Cat. age, hrs. | Run Variables | | | Liquid Product Comp., Wt. Percent | | |
|---|---|---|---|---|---|---|---|
| | | Temp., °C. | P.p.m. S[1] | P.p.m. N | MCH[2] | E and DMCP[3] | Toluene |
| 1 | 18 | 280 | 0 | 0 | [4]78.5 | Tr | 21.5 |
| 2 | 25 | 337 | 0 | 0 | [4]97.5 | 1.6 | 0.9 |
| 3 | 35 | 282 | 100 | 0 | [4]52.1 | 0.1 | 47.8 |
| 4 | 39 | 280 | 500 | 0 | [4]13.2 | Tr | 86.8 |
| 5 | 43 | 280 | 200 | 0 | [4]29.2 | 0.1 | 70.7 |
| 6 | 47 | 343 | 200 | 0 | [4]78.9 | 2.2 | 18.9 |
| 7 | 50 | 280 | 200 | [5]200 | [4]0.1 | ND | 99.9 |
| 8 | 65 | 280 | 200 | 0 | [4]26.4 | Tr | 73.6 |
| 9 | 68 | 340 | 500 | 0 | [4]50.3 | 0.2 | 49.5 |
| 10 | 76 | 372 | 500 | 0 | [4]69.7 | 5.0 | 25.3 |
| 11 | 82 | 282 | 100 | 0 | [4]53.3 | 0.1 | 46.6 |
| 12 | 107 | 278 | 200 | [6]200 | 7.1 | Tr | 92.9 |
| 13 | 120 | 281 | 200 | 0 | 22.1 | Tr | 77.9 |
| 14 | 128 | 276 | 200 | [7]200 | 2.6 | Tr | 97.4 |
| 15 | 137 | 282 | 200 | 0 | 27.0 | Tr | 73.0 |
| 16 | 140 | 276 | 200 | [5]200 | 0.2 | ND | 99.8 |
| 17 | 148 | 339 | 200 | [5]200 | 44.4 | Tr | 55.5 |
| 18 | 156 | 310 | 200 | [5]200 | 4.0 | 0.1 | 95.9 |
| 19 | 159 | 370 | 200 | [5]200 | 73.0 | Tr | 26.9 |
| 20 | 172 | 281 | 200 | 0 | 27.8 | Tr | 72.2 |
| 21 | 183 | 340 | 0 | [5]200 | 97.4 | Tr | 2.5 |

[1] Sulfur as carbon disulfide in doped feed.
[2] Methylcyclohexane.
[3] Ethyl- and dimethylcyclopentane.
[4] Included ECP (ethyl cyclopentane) which is usually equal to sum of DMCP's (dimethylcyclopentanes).
[5] Nitrogen as pyridine in doped feed.
[6] Nitrogen as ammonia in doped feed.
[7] Nitrogen as tri-n-propylamine.

The results shown in Table I demonstrate that the platinum catalyst retained in its activity over a period of at least 183 hours while having been subjected to sulfur and nitrogen poisons. The results further show that higher temperatures are required when both nitrogen and sulfur are present (see tests 7, 12, 16, 17, 18 and 19 which indicate greater catalyst effectiveness at higher temperatures) as compared to when sulfur is the only contaminant in the hydrocarbon feed. Also, the results show that with nitrogen-free feedstocks, the level of hydrogenation that is obtained varies with the sulfur content of the feedstock. For instance, at a temperature of 280° C. and no sulfur contamination about 78% of the feed was hydrogenated (1), with 100 p.p.m. sulfur and at the same temperature, 52% of the feedstock was hydrogenated (3), at 200 p.p.m. sulfur and at the same temperature, 29% of the feedstock was hydrogenated (5), and at 500 p.p.m. sulfur and the same temperature, only 13% of the feedstock was hydrogenated (4). The results further indicate that adjustment of the temperature to compensate for differences in the amount of sulfur and nitrogen contained in the feed is helpful in establishing the catalytic hydrogenation activity conditions required (dynamic equilibrium).

results are obtained at pressures of about 1500 p.s.i.g., hydrogen-to-oil feed molar ratios of 19:1 and at about 370° to 400° C. The results obtained in Example 37 in which the temperature was increased up to 424° C. show the decline in effectiveness as the temperatures are raised beyond a particular point.

TABLE III.—HYDROGENATION OF STOVE OIL [a] OVER PLATINUM CATALYST:[b] EFFECT OF HIGHER PRESSURE AND HIGHER TEMPERATURES

| | Feed | Example | | | | | | | | | |
|---|---|---|---|---|---|---|---|---|---|---|---|
| | | 32 | 33 | 34 | 35 | 36 | 37 | 38 | 39 | 40 | 41 |
| Run conditions: | | | | | | | | | | | |
| Pressure, p.s.i.g. | | 800 | 800 | 1,500 | 1,500 | 1,500 | 1,500 | 800 | 800 | 800 | 800 |
| Temperature, ° C. | | 370 | 370 | 370 | 370 | 400 | 424 | 340 | 340 | 370 | 370 |
| LHSV, Hr.$^{-1}$ | | 5 | 5 | 5 | 5 | 5 | 5 | 5 | 2.5 | 2.5 | 2.5 |
| $H_2$:Oil [d] molar ratio | | 9.5 | 19 | 9.5 | 19 | 9.5 | 9.5 | 9.5 | 9.5 | 19 | 38 |
| Liquid Product: | | | | | | | | | | | |
| Gravity, ° API at 60° F. | 38.7 | 39.2 | 39.5 | 39.5 | 39.5 | 40.1 | 39.9 | 39.9 | 39.1 | 39.2 | 39.7 | 40.1 |
| Refract. index, $n_D^{20}$ | 1.4581 | 1.4558 | 1.4553 | 1.4546 | 1.4521 | 1.4536 | 1.4538 | 1.4558 | 1.4558 | 1.4534 | 1.4521 |
| FIA, vol. percent: | | | | | | | | | | | |
| Saturates | 80.1 | 81.9 | 84.5 | 84.3 | 88.5 | 86.4 | 83.1 | 81.7 | 82.0 | 84.8 | 89.7 |
| Olefins | 0.4 | 0.4 | 0.2 | 0.2 | 0.6 | 0.2 | 0.4 | 0.4 | 0.2 | 0.6 | 0.3 |
| Aromatics | 19.5 | 17.7 | 15.3 | 15.5 | 10.9 | 13.4 | 16.5 | 17.9 | 17.8 | 14.6 | 10.0 |
| Smoke Point | 17.5 | 19.5 | 19.0 | 21.0 | 21.0 | 19.5 | 17.5 | | | | |
| Sulfur, p.p.m. | | | | | | | | | 260 | | | |
| Basic nitrogen, p.p.m. | ([c]) | | | | | | | | 9.0 | 4.0 | 0.5 | 0.5 |

[a] Unit No. 81 PTSS Stove Oil having distillation characteristics as follows: IBP at 344° F., 10 vol. percent at 389° F., 50 vol. percent at 427° F., 90 vol. percent at 476° F., and EP at 522° F.
[b] A single 20 ml. charge of Engelhard RD-150 (0.6 wt. percent Pt) reforming catalyst was used for all experiments.
[c] Total nitrogen in the feedstock was 48 p.p.m.
[d] The $H_2$:aromatic molar ratio was approximately five times the reported figure.

EXAMPLES 22–31

Toluene containing various amounts of sulfur and nitrogen contaminants was hydrogenated in another series of tests using the same procedure and apparatus as was used in Example 1 above. The results obtained are shown in Table II.

EXAMPLES 42–45

This series of tests was conducted using toluene doped with carbon disulfide to compare the effectiveness of rhodium and palladium catalysts with platinum in the hydrogenation of aromatic compounds in the presence of sulfur.

The same procedure was used for these tests as for Examples 1–21 above. Test conditions were 800 p.s.i.g., 20 liquid hourly space velocity, and a 5:1 molar ratio of hydrogen to toluene. The results of these tests which are shown in Table IV illustrate the substantially greater effectiveness of a platinum catalyst in the presence of sulfur poisons. The palladium and rhodium catalysts,

TABLE II.—HYDROGENATION OF TOLUENE OVER 0.6 WT. PERCENT PLATINUM CATALYST

| | Cat. age, hrs. | Temp., ° C. | LHSV | P.p.m. S [1] | P.p.m. N [2] | Liquid Product Comp., Wt. percent | | |
|---|---|---|---|---|---|---|---|---|
| | | | | | | MCH | E and DMCP | Toluene |
| Example: | | | | | | | | |
| 22 | 11 | 340 | 20 | 200 | 0 | 59.5 | ND | 40.5 |
| 23 | 15 | 281 | 20 | 200 | 0 | 15.3 | ND | 84.7 |
| 24 | 20 | 340 | 20 | 500 | 0 | 35.3 | Tr | 64.7 |
| 25 | 25 | 369 | 20 | 500 | 0 | 51.4 | 0.05 | 48.5 |
| 26 | 28 | 372 | 20 | 2,500 | 0 | 11.2 | Tr | 88.8 |
| 27 | 33 | 336 | 20 | 0 | 0 | 99.3 | Tr | 0.7 |
| 28 | 36 | 340 | 20 | 0 | 200 | 98.2 | ND | 1.7 |
| 29 | 42 | 371 | 5 | 200 | 0 | 91.1 | 0.1 | 8.8 |
| 30 | 50 | 340 | 5 | 2,500 | 100 | 3.4 | 0.1 | 96.4 |
| 31 | 56 | 340 | 5 | 500 | 100 | 32.0 | Tr | 67.9 |

Constant conditions: 800 p.s.i.g. and a 5:1 molar hydrogen to toluene ratio.
[1] Sulfur present as carbon disulfide in doped feed.
[2] Nitrogen present as pyridine in doped feed.

EXAMPLES 32–41

Another group of tests was conducted in which a selected stove oil fraction containing nitrogen and sulfur contaminants was hydrogenated under varying conditions of temperature, pressure, liquid hourly space velocity, and hydrogen-to-aromatic molar ratios using the procedure described in Example 1. Results of these tests are shown in Table III. These examples show that better while performing well in the absence of sulfur, are almost completely deactivated in the presence of sulfur whereas the platinum catalysts, while being reduced slightly in performance, remain highly effective. Furthermore, neither rhodium nor palladium catalysts, as the data illustrates, are quickly revitalized when used subsequently with a sulfur-free feed. The platinum catalysts on the other hand are quickly restored to full sulfur-free activity when subsequently used with a sulfur-free feed.

TABLE IV

| Sequence of testing | 1 | 2 | 3 | 3 | 4 |
|---|---|---|---|---|---|
| Temperature, °C | 280 | 280 | 370 | 370 | 370 |
| Sulfur content of feed p.p.m. ($CS_2$) | 0 | 200 | 200 | 500 | 0 |

| Catalyst | Saturated Product In Weight Percent [1] | | | | |
|---|---|---|---|---|---|

| Example: | | | | | |
|---|---|---|---|---|---|
| 42 ... 0.6% Pt, $Al_2O_3$ | 78.3(18) | 29.3(43) | | 75.3(76) | |
| 43 ... 0.6% Pt, $Al_2O_3$ | | | | 51.5(25) [2] | 99.3(33) |
| 44 ... 0.5% Rh, $Al_2O_3$ | 58.8(3) | 0.2(6) | 2.3(9) | | 8.7(13) |
| 45 ... 0.5% Pd, $SiO_2$, $Al_2O_3$ | 35.0(3) | 3.0(6) | 10.0(10) | | 14.2(14) |

[1] Numbers in parenthesis indicate hours on stream.
[2] Temperature was 336° C. An intervening run with 2,500 p.p.m. sulfur (28 hrs. age) preceding the sulfur-free run.

The effectiveness of this invention may further be appreciated by reference to FIGURES 2 through 5. The numerals included in these graphs indicate the examples previously described.

Data points 26 and 30, FIGURE 2, indicate that there is little if any hydrogenation of aromatics, using alumina supported platinum catalysts, at temperatures below 300° C. Since the example of point 30 also included 100 p.p.m. of nitrogen, this data point is probably slightly lower than would be expected for the same temperature in the absence of nitrogen, as is illustrated in the case of data points 24 and 31 in FIGURE 4. It is clear, however, that operating below 300° C. would produce little if any hydrogenation. Effective hydrogenation must be carried out in the range of above 320° C. and, for thermodynamic reasons, is preferable at below 425° C. although operating temperatures up to 450° C. are possible.

When the sulfur content is 200 p.p.m., the results are even more striking, as illustrated in FIGURE 3. The data in FIGURE 3 represents two series of experimental runs. One series is represented by data points 5, 6, 8, 13 and 29 and the other series is represented by data points 22 and 23. While the absolute values differ somewhat, it is apparent that there is a surprising and most unexpected increase in hydrogenation yield at temperatures above about 320° C. The lines connecting these points are approximately straight on the figure, however, it must be recognized that data do not necessarily support a linear relationship. Indeed, reference to FIGURE 5 suggests that the curves would incline more steeply down than the graphs would indicate with a slight inflection in the range of 300 to 320° C. In any event, it is clear that by operating within the temperature range, and under the process conditions, of the present invention, i.e., 320° C. to 450° C., a surprisingly high hydrogenation yield may be obtained.

Figure 4:
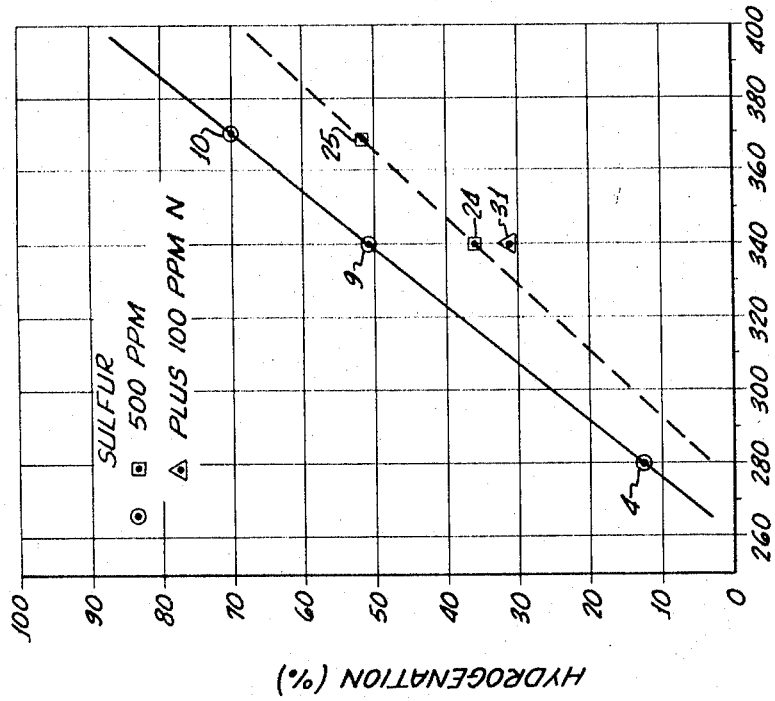

Again, while the actual numbers differ, the same surprising results as shown in FIGURE 4, wherein data points 4, 9, and 10 illustrate one series of experiments at 500 p.p.m. sulfur, data points 24 and 25 indicate another series of experiments at a level of 500 p.p.m. sulfur and data point 31 illustrates an experiment similar to that of data points 24 and 25 with the addition of 100 p.p.m. nitrogen. Again, the reader is cautioned that, while the graphs show these lines to be straight, data are not available to determine the actual shape of these curves and, for the reason previously mentioned, there is basis for believing that there is a sharper downward curve in the range of about 320° C. As illustrated by data points 25 and 31, when operating in the temperature range of this invention the nitrogen has a comparatively minor effect on the overall hydrogenation yield. This is not to suggest that nitrogen does not have an important effect on the process, however. It is pointed out that at temperatures below the process conditions of this invention or in the borderline area thereof the addition of minor proportions of nitrogen may drastically affect the hydrogenation unit.

Figure 5:
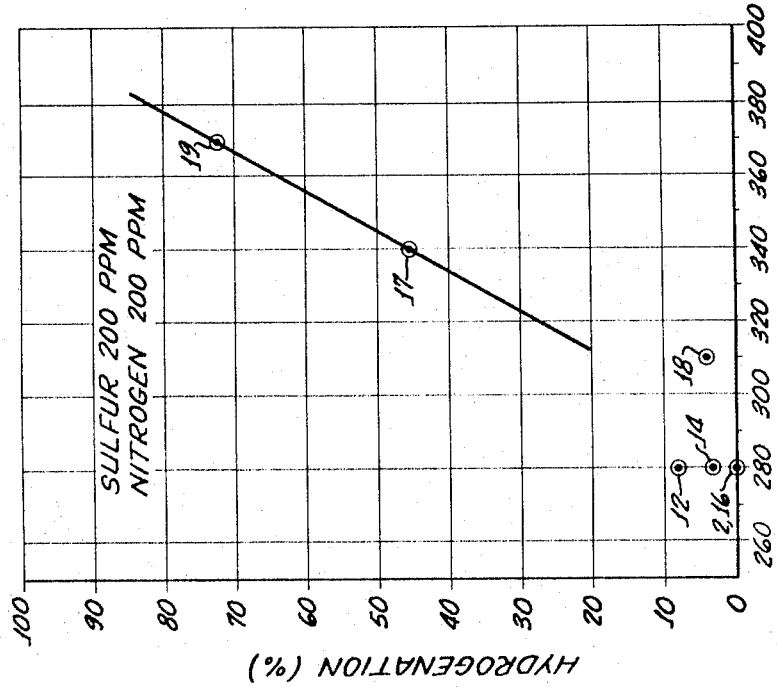

The effect of nitrogen at a level of 200 p.p.m. in combination with sulfur at the same level is shown in FIGURE 5. The data are somewhat scattered, perhaps because of experimental or analytical variations, in the low operating temperature range. It is apparent, however, that at a point in the vicinity of about 320° C. there is a point of inflection and a sharp upward curvature to the hydrogenation v. temperature curve. When operating in the range of this invention, effective hydrogenation may be carried out even in the presence of significant quantities of both sulfur and nitrogen. Data point 17 as compared with data points 6 and 22 and data point 19 as compared with data point 29, data points 6, 22 and 29 being shown in FIGURE 3, illustrate that while there is a reduction in hydrogenation effectiveness when sulfur and nitrogen are mixed, nevertheless an effective hydrogenation process for aromatics, such as toluene used in these experiments, may be carried out.

While toluene has been selected as exemplary of the type of aromatic compound which may be hydrogenated, other data reported herein and data which are available clearly indicate the effectiveness of these process conditions for aromatics alone or appearing in petroleum and petroleum products and analogous compositions. Obviously, therefore, the inventive process may be adapted to other aromatics and mixed aromatic compositions without departing from the spirit and scope of the invention as defined in the following claims.

I claim:
1. A method for nondestructive hydrogenation of aromatic hydrocarbons contained in a feed stock which includes sulfur contaminants in the range of from greater than about 200 p.p.m. to about 2500 p.p.m., nitrogen contaminants in the range of from about 10 to about 500 p.p.m., and mixtures thereof in said ranges which comprises: passing a mixture of hydrogen and said aromatic hydrocarbon containing feed stocks into contact with a platinum metal catalyst supported on essentially silica-free alumina under non-cracking hydrogenation conditions at a temperature of from about 320° C. to about 450° C., a pressure of about 100 to 150 p.s.i.g. and a hydrogen-to-aromatic hydrocarbon molar ratio of at least 5:1.

2. The method of claim 1 wherein the temperature is between about 320° C. and about 425° C.

3. The method of claim 2 wherein a liquid hourly space velocity of from about 0.25 to about 40 is maintained during the hydrogenation of said aromatic hydrocarbons and said catalyst contains at least 0.1 percent platinum metal on silica-free alumina.

4. The method of claim 3 wherein the temperature is maintained between about 340° C. and about 375° C.

5. The method of claim 1 wherein the feed stock contains greater than 400 p.p.m. sulfur.

References Cited

UNITED STATES PATENTS

| 2,898,387 | 8/1959 | Teter | 260—667 |
| 3,317,419 | 5/1967 | Fortman | 208—97 |
| 3,269,939 | 8/1966 | Marechal | 208—143 |
| 3,394,077 | 7/1968 | Kovach | 208—216 |

DELBERT E. GANTZ, Primary Examiner

V. O'KEEFE, Assistant Examiner

U.S. Cl. X.R.

208—143